Walker & Lilly,
Spittoon Lifter.
No. 113,822. Patented Apr. 18, 1871.
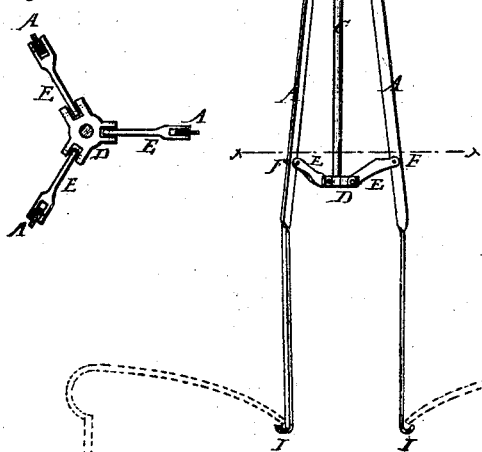

United States Patent Office.

JAMES WALKER AND HENRY F. LILLY, OF PHILADELPHIA, PENNSYLVANIA.

Letters Patent No. 113,822, dated April 18, 1871.

IMPROVEMENT IN LIFTERS FOR SPITTOONS, &c.

The Schedule referred to in these Letters Patent and making part of the same.

*To all whom it may concern:*

Be it known that we, JAMES WALKER and HENRY F. LILLY, of Philadelphia, in the county of Philadelphia and State of Pennsylvania, have invented a new and useful Improvement in Spittoon-Lifter; and we do hereby declare that the following is a full, clear, and exact description thereof, which will enable others skilled in the art to make and use the same, reference being had to the accompanying drawing forming part of this specification.

This invention relates to a new and useful improvement in an implement for lifting spittoon and other hollow vessels, and for other purposes, as solid or spherical objects, cannon-balls, &c.; and It consists in expanding or contracting the ends of three or more rods or bars by operating a central rod, which is connected with the said adjustable bars by jointed arms, the whole being constructed and arranged to operate as hereinafter more fully described and specified.

In the accompanying drawing—

Figure 1 represents a sectional view of the implement.

Figure 2 is a horizontal section on the line $x$ $x$ of fig. 1.

Similar letters of reference indicate corresponding parts.

A represents bars, three or more in number, which are hinged to ears on the tube B by pins, as seen in fig. 1 at B'.

C is a central rod, which works through the tube B, on the lower end of which is a spider, D, with ears thereon, to which are hinged arms E, (one for each bar.)

The other ends of these arms are jointed to the bars, as seen at F F, two only of the bars being seen in fig. 1.

G is a spiral spring on the rod C, confined between the upper end of the tube B and the ring H, so that the tendency of the spring is to force the rod upward.

The spring may be placed in any other position, so as to force the rod down or up, to either expand or contract the ends of the bars.

The arms E may be so arranged as to either expand or contract the ends of the bars by lifting on the central rod.

The hooks I on the ends of the bars A may be turned inward instead of outward, so as to engage with the outside of an article instead of the inside.

In the present example of our invention the implement is adapted to lifting spittoons by inserting the hooks into the central opening thereof; but we do not confine ourselves to that particular mode of application.

Having thus described our invention,

We claim as new and desire to secure by Letters Patent—

The bars A, rod C, tube B, central spider D, spring G, and jointed arms E, and arranged to operate substantially as and for the purposes herein described.

JAMES WALKER.
HENRY F. LILLY.

Witnesses:
DAVID C. WALKER,
ANDREW J. JORDAN.